(12) United States Patent  
Sasada et al.

(10) Patent No.: US 6,727,853 B2
(45) Date of Patent: Apr. 27, 2004

(54) HIGH FREQUENCY TRANSMITTER-RECEIVER

(75) Inventors: Yoshiyuki Sasada, Hitachinaka (JP); Tadashi Isono, Mito (JP); Shiro Oouchi, Hitachinaka (JP); Terumi Nakazawa, Naka-machi (JP); Mamoru Ooba, Hitachinaka (JP)

(73) Assignees: Hitachi, Ltd., Tokyo (JP); Hitachi Car Engineering Co., Ltd., Ibaraki (JP)

( * ) Notice: Subject to any disclaimer, the term of this patent is extended or adjusted under 35 U.S.C. 154(b) by 72 days.

(21) Appl. No.: 10/084,384

(22) Filed: Feb. 28, 2002

(65) Prior Publication Data

US 2003/0016162 A1 Jan. 23, 2003

(30) Foreign Application Priority Data

Jul. 23, 2001 (JP) ........................................ 2001-220940

(51) Int. Cl.[7] ................................................. H01Q 1/38
(52) U.S. Cl. ............................... 343/700 MS; 343/713; 343/872
(58) Field of Search .................. 343/700 MS, 711, 343/713, 872; H01Q 1/38

(56) References Cited

U.S. PATENT DOCUMENTS

| | | | | |
|---|---|---|---|---|
| 5,400,039 A | * | 3/1995 | Araki et al. | 343/700 MS |
| 5,625,365 A | * | 4/1997 | Tom et al. | 343/700 MS |
| 5,757,327 A | * | 5/1998 | Yajiima et al. | 343/713 |
| 6,002,370 A | * | 12/1999 | Mckinnon et al. | 343/700 MS |
| 6,008,750 A | | 12/1999 | Cottle et al. | |

FOREIGN PATENT DOCUMENTS

EP 0978729 2/2000

* cited by examiner

*Primary Examiner*—Hoanganh Le
(74) *Attorney, Agent, or Firm*—Crowell & Moring LLP (57) ABSTRACT

A high frequency transmitter-receiver which can prevent an antenna pattern from being broken. A radar apparatus is provided with a high frequency antenna, a base plate and a module. The antenna is comprised of an organic substrate and a metal pattern formed on the organic substrate. The high frequency antenna is adhered to the base plate astride the module. Here, the gap between the base plate and the module where the antenna is adhered is configured to satisfy the expression (an amount of change in gap size with respect to a change in use temperature)÷(an original gap size)≦6%.

4 Claims, 13 Drawing Sheets

HIGH FREQUENCY TRANSMITTER-RECEIVER

BACKGROUND OF THE INVENTION

The present invention relates to a high frequency transmitter-receiver, and more particularly to a high frequency transmitter-receiver employing an antenna-equipped system suitably used for vehicle-mounted radar equipment.

The high frequency transmitter-receiver used for a conventional vehicle-mounted radar equipment has a base plate, on which a circuit board is mounted, and an antenna substrate adhered astride an antenna base. It is because the base plate is advantageous to be smaller in terms of costs, while the antenna substrate is a flat antenna and desired to be large to obtain directivity of the radar.

The conventional high frequency transmitter-receiver has a base plate which is made of a metal having a low coefficient of linear expansion, such as a Kovar, to form a glass coaxial cable. Meanwhile, an antenna base 102 is made of iron, aluminum or the like. As a result, there is a disadvantage that a difference of the coefficient of linear expansion between the base plate and the antenna base is large, so that a thermal stress is produced in the antenna substrate at a position corresponding to the boundary part between the antenna base and the base plate, and an antenna pattern formed on the antenna substrate is distorted and broken.

SUMMARY OF THE INVENTION

It is an object of the present invention to provide a high frequency transmitter-receiver which can prevent an antenna pattern from being broken.

(1) In order to achieve the object of the invention, the present invention is directed to a high frequency transmitter/receiver which has a high frequency antenna comprised of an organic substrate and a metal pattern formed on the organic substrate and a base to which the high frequency antenna is fixed by adhering, wherein the base is formed of a plurality of bases and the high frequency antenna is fixed by adhering to cover the plurality of bases; and a gap between the plurality of bases to which the antenna is adhered satisfies the expression (an amount of change in gap size to a change in operating temperature)÷(an original gap size)≦6%.

By configuring as described above, the antenna pattern can be prevented from being broken.

(2) In the above item (1), it is preferable that the metal pattern having an aspect ratio (width/thickness) of a width and a thickness of the metal pattern is 3 or more or a width of 100 μm or more may be formed to cover the plurality of bases.

(3) In the above item (1), it is preferable that the metal pattern is formed on the side of the antenna within the boundary where the antenna is adhered to and to cover the plurality of bases.

(4) In the above item (1), it is preferable that a high frequency transmitter/receiver, which has a high frequency antenna comprised of an organic substrate and a metal pattern formed on the organic substrate and a base to which the high frequency antenna is fixed by adhering, comprising a high frequency circuit mounted on the base; an external circuit for supplying power to the high frequency circuit and processing a signal; a plurality of conducting pins which are supported by an insulator in an opening formed through the base and electrically connect the high frequency circuit with the antenna and the high frequency circuit with the external circuit; and a recess which is formed in the base to have the conducting pin located at back of the antenna surface with respect to a direction of transmitting and receiving a signal to and from the antenna and which is covered by the antenna.

By configuring as described above, effects of a power supply line and a signal processing line on the antenna can be reduced.

(5) In order to achieve the aforementioned object, the present invention is also directed to a high frequency transmitter/receiver, which has a high frequency antenna comprised of an organic substrate and a metal pattern formed on the organic substrate and a base to which the high frequency antenna is fixed by adhering, comprising an opening formed through the base; and a module which is mounted on one side of the base having the high frequency antenna mounted on the other side and which has a high frequency circuit for supplying a signal to the antenna made airtight; wherein the antenna is connected to a power supply line formed on the module through the opening.

By configuring as described above, the antenna pattern can be prevented from being broken.

(6) In the aforementioned item (5), it is preferable that the power supply line is a coaxial cable having an impedance of about 50Ω and made of glass and a core; the opening forms a coaxial cable having an impedance of about 50Ω by the core and air in the opening; and a circuit with a matching impedance is formed on the antenna or the high frequency circuit.

(7) In order to achieve the aforementioned object, the present invention is also directed to a high frequency transmitter/receiver, which has a high frequency antenna comprised of an organic substrate and a metal pattern formed on the organic substrate and a base to which the high frequency antenna is fixed by adhering, comprising an opening formed through the base; and a module which is mounted on one side of the base having the high frequency antenna mounted on the other side and which has a high frequency circuit for supplying a signal to the antenna made airtight; wherein the antenna has a power supply line formed on the module and the opening electromagnetically connected to form an impedance matching circuit on the antenna or the high frequency circuit.

By configuring as described above, the antenna pattern can be prevented from being broken.

(8) In the above item (7), it is preferable that the antenna is electromagnetically connected by a waveguide structure formed on the module to form an impedance matching circuit on the antenna or the high frequency circuit.

(9) In order to achieve the aforementioned object, the present invention is also directed to a high frequency transmitter/receiver which has a high frequency antenna comprised of an organic substrate and a metal pattern formed on the organic substrate and a base to which the high frequency antenna is fixed by adhering, wherein the base is a ceramic substrate and has a module which is mounted on one side of the base opposite of the side to which the high frequency antenna is mounted and which has a high frequency circuit for supplying a signal to the antenna; and the module is electrically connected to the antenna through the ceramic substrate by a coplanar line.

By configuring as described above, the antenna pattern can be prevented from being broken.

(10) In order to achieve the aforementioned object, the present invention is also directed to a high frequency transmitter/receiver, which has a high frequency antenna comprised of an organic substrate and a metal pattern formed on the organic substrate and a base to which the high frequency antenna is fixed by adhering, wherein the base is a ceramic substrate and has a module which is mounted on one side of the base opposite of the side to which the high frequency antenna is mounted and which has a high frequency circuit for supplying a signal to the antenna; and the module is electrically connected to the antenna through the ceramic substrate by a coplanar line, and the antenna substrate is adhered to the ceramics substrate without extending off the ceramics substrate.

By configuring as described above, the antenna pattern can be prevented from being broken.

DESCRIPTION OF THE EMBODIMENTS

Referring to FIG. 1 to FIG. 6, a structure of the high frequency transmitter-receiver according to the first embodiment of the present invention will be described. In this embodiment, the high frequency transmitter-receiver will be described with reference to radar equipment as an example.

First, a general structure of the high frequency transmitter-receiver according to this embodiment will be described with reference to FIG. 1 to FIG. 3.

Figure 1:
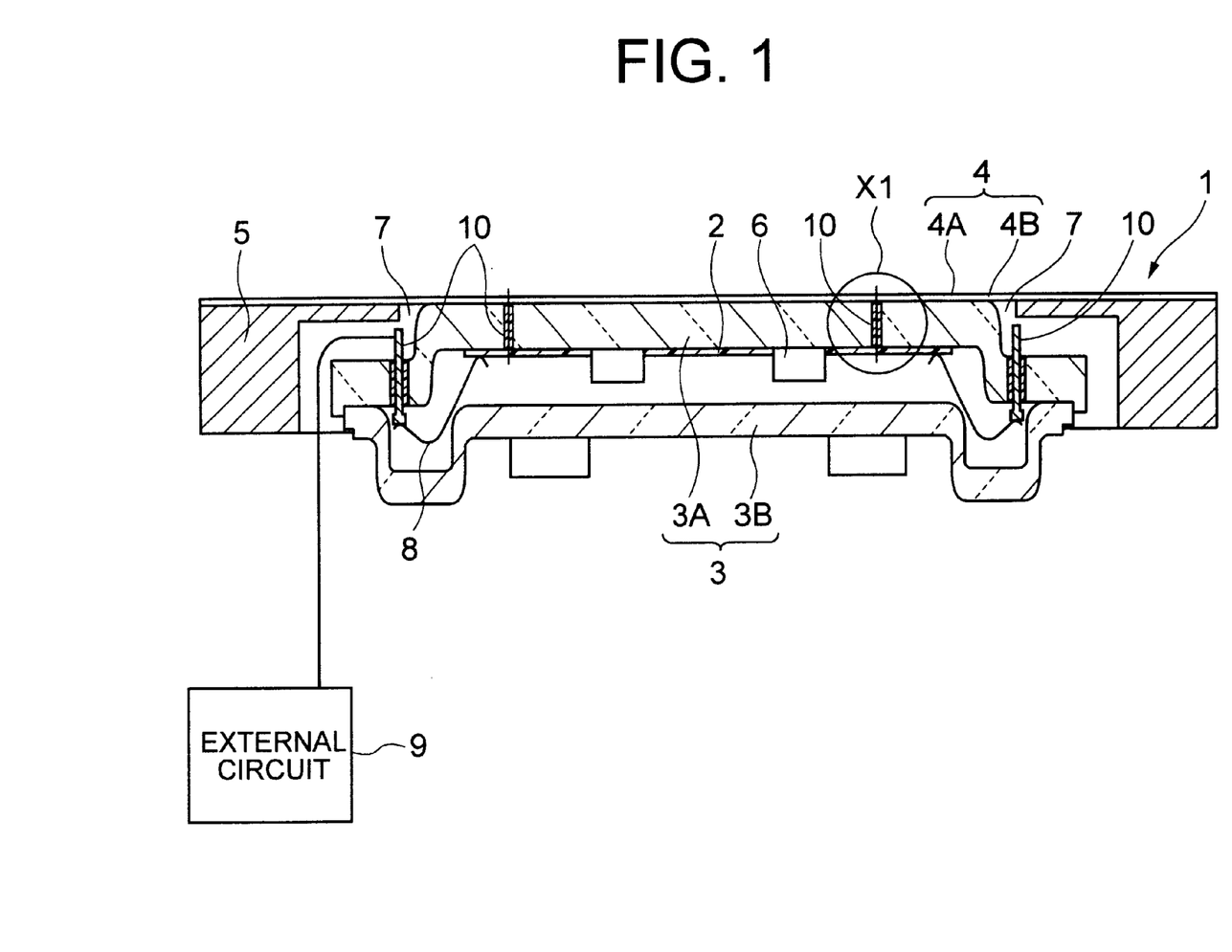
FIG. 1 is a sectional diagram showing a general structure of the high frequency transmitter-receiver according to a first embodiment of the present invention.

FIG. 1 is a sectional diagram showing the general structure of the high frequency transmitter-receiver according to the first embodiment of the invention. FIG. 2 is an enlarged sectional diagram of the portion in the circle X1 of FIG. 1. FIG. 3 is a plan view of FIG. 1. Like reference numerals used in FIG. 1 to FIG. 3 designate like parts.

As shown in FIG. 1, vehicle-mounted radar equipment 1 is comprised of a high frequency circuit board 2, a module 3, an antenna 4 and a base plate 5.

First, the structure of the high frequency circuit board 2 will be described with reference to FIG. 1 and FIG. 2. As shown in FIG. 2, the high frequency circuit board 2 has a circuit pattern 2B of multi-layered metal such as Cu foil, Cu plating, Ni plating, Au plating or the like formed on an organic substrate 2A of fluoroplastic or the like. GND 2C is formed on the opposite surface of the surface on which the organic substrate 2A is formed.

As shown in FIG. 1, the high frequency circuit board 2 is provided with a plurality of ICs 6 for a high frequency, such as an oscillator, a mixer or a low noise amplifier which is made of a semiconductor substrate of GaAs or the like. Each IC 6 is connected to a circuit pattern of the high frequency circuit board 2 by connecting means such as Au wire bonding or flip chip bonding and performs signal transmission and reception.

The module 3 is comprised of a module case 3A and a module cover 3B as shown in FIG. 1. The module case 3A is formed of a low expansion metal such as an Fe—Ni—Co alloy. The circuit board 2 is mounted on the module case 3A by bonding with an Ag adhesive or the like. The module cover 3B is made of Fe and welded to the module case 3A so that the circuit board 2 can be kept in an airtight state within it.

In the illustrated example, four glass coaxial cables 10 are embedded into the module case 3A. The antenna 4 has a transmitting antenna section and a receiving antenna section as described later. Among the four glass coaxial cables 10, the two glass coaxial cables 10 at the center in the drawing each are connected to the transmitting antenna section of the antenna 4 and the transmitting circuit on the circuit board 2 and to the receiving antenna section of the antenna 4 and the receiving circuit on the circuit board 2 so to receive a signal and power. The two other glass coaxial cables 10 respectively located on either side in the drawing are used to connect to an external circuit 9 or the like.

The cost of manufacturing the glass coaxial cables 10 is substantially proportional to the area of the module case 3A, so that the module case 3A is produced in a minimal size.

A method of manufacturing the glass coaxial cable 10 will be described with reference to FIG. 2. To produce the glass coaxial cable 10, a tablet of glass 10A which is made in the shape of the glass to be formed and a core 10B of an Fe—Ni—Co alloy or the like are set in the formed module case 3A, and they are put in a high-temperature furnace to melt the glass at about 1000° C. to form the glass coaxial cable 10. The manufacturing cost of the glass coaxial cable 10 is mostly for the calculation process of the glass 10A, and the cost is determined depending on how many module cases 3A can be placed in the furnace because the production process in the furnace is batch processing. Therefore, the cost is substantially proportional to the area of the module case 3A.

Figure 2:
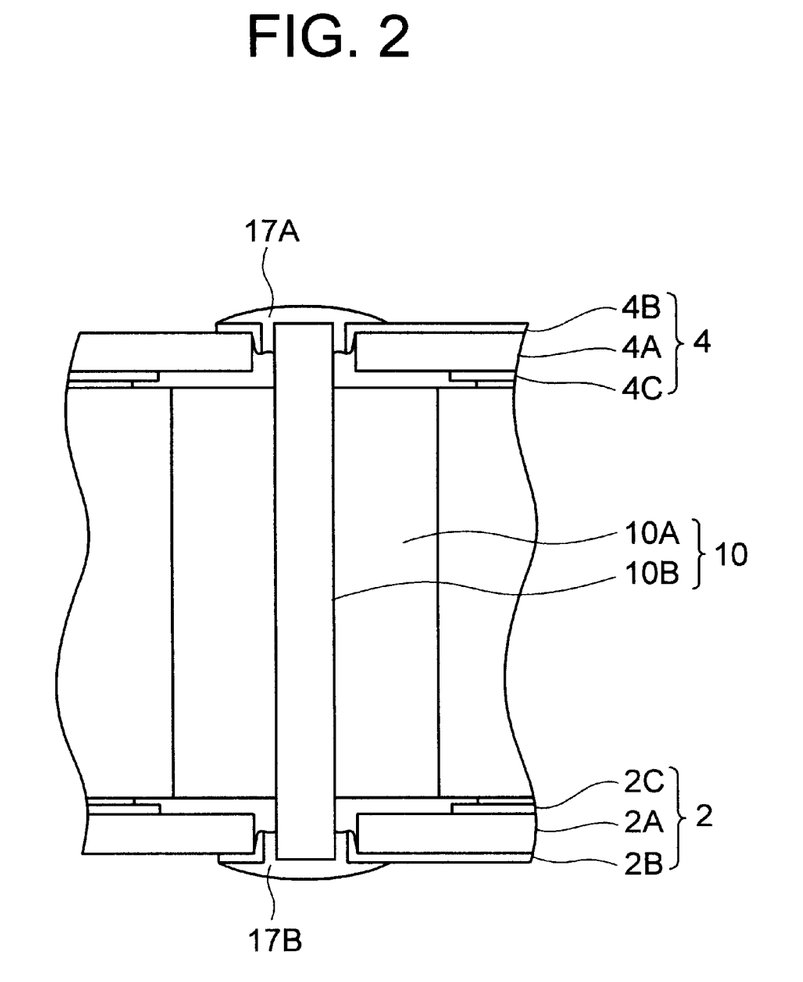
FIG. 2 is an enlarged sectional diagram of the section shown in a circle X1 of FIG. 1.
Figure 3:
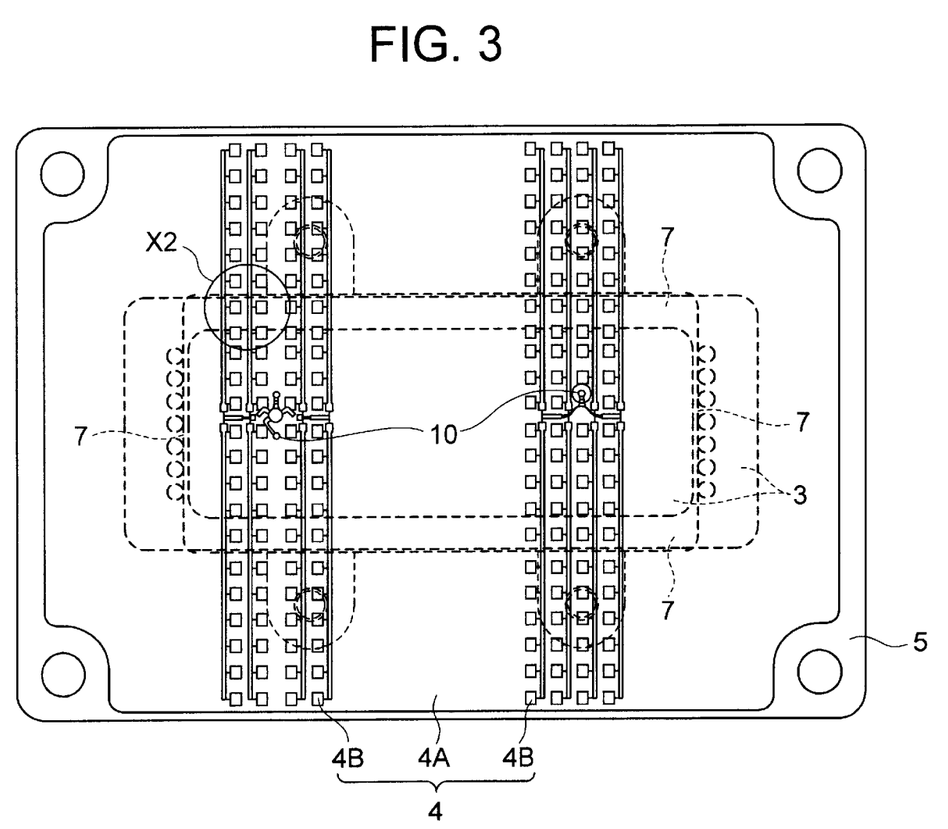
FIG. 3 is a plan view of FIG. 1.

Referring to FIG. 1, FIG. 2 and FIG. 3, the structure of the antenna 4 will be described. The antenna 4 is a patch antenna of a micro strip. As shown in FIG. 2, the antenna 4 has the antenna pattern 4B of multi-layered metal of Cu foil, Cu plating, Ni plating, Au plating or the like formed on the organic substrate 4A of fluoroplastic or the like. Among such plating, the Ni plating has a particularly small expansion of about 6%, so that a break in the antenna depends on Ni. The GND 4C is formed on the opposite surface to the surface of the organic substrate 4A which has the antenna pattern 4B formed on the other surface.

In the vehicle-mounted radar equipment 1, the antenna 4 is provided with the organic substrate 4A of fluoroplastic having a low dielectric constant and a low dielectric dissipation factor in order to lower a transmission loss. As a transmission line, a micro strip line has the GND 4C formed on one surface of the organic substrate 4A by metalizing a multiple layer of Cu foil, Cu plating, Ni plating, Au plating or the like. On the other surface, the antenna pattern 4B is formed so that the transmission line has an impedance of 50Ω.

For example, when the organic substrate 4A has thickness of 127 μm and a relative dielectric constant of 2.2 and the antenna pattern 4B have thickness of 40 μm, a line width is 380 μm and impedance is 50Ω. But, the antenna pattern 4B has a portion locally having thickness of about 70 μm in order to make matching of the impedance.

The antenna pattern 4B is a patch antenna of a micro strip which has patches to be a rectangular antenna arranged in the matrix state of, for example, four columns and 22 rows and the respective patches connected by a line as shown in FIG. 3.

When the radar is mounted on a vehicle and used to measure a distance and radio waves radiated by the antenna 4 are required to have directivity, it is advantageous to be large and has an area of about 100 mm². As described above, the module case 3A is advantageously small in terms of the cost, so that the antenna 4 is large as compared with the module case 3A.

The base plate 5 will be described with reference to FIG. 1, FIG. 2 and FIG. 3. The antenna 4 is larger than the module case 3A, and an opening 7 is formed in the base plate 5 as shown in FIG. 1. The module 3 is mounted in the opening 7. Therefore, the opening 7 is formed along the four sides of the module case 3A between the base plate 5 as shown in FIG. 3. The antenna 4 is adhered to the base plate 5 and the module 3 with an adhesive to cover the opening 7 between them. The antenna 4 and the circuit board 2 are electrically connected through the glass coaxial cable 10 by solder 17A, 17B as shown in FIG. 2. The circuit board 2 and the external circuit 9 are connected to the glass coaxial cable 10 by an Al wire 8 on the side of the circuit board 2 and connected to the glass coaxial cable 10 on the side of the external circuit 9 by soldering.

The base plate 5 is formed of the same material as the module case 3A, which is a low expansion metal such as an Fe—Ni—Co alloy or the like. When the material of the base plate 5 is different from that of the module case 3A and the space between the two members is expressed as follows:

(an amount of change in space size to a change in temperature)÷(an original space size)>6%, addition of a temperature change to the vehicle-mounted radar equipment 1 produces a thermal stress in the antenna 4 which is adhered to the base plate 5 and the module case 3A shown in FIG. 1 to FIG. 3.

Here, an effect of the thermal stress to the antenna 4 will be described. When the thermal stress is produced as described above, the organic substrate 4A, which has a low Young's modulus, is largely deformed depending on an amount of thermal deformation of the organic substrate 4A positioned to cover the opening 7 which is substantially determined by the module case 3A and the base plate 5 and, at the same time, the antenna pattern 4B on the organic substrate 4A is cracked when deformation of Ni reaches 6%.

Therefore, the same material is used for the base plate 5 and the module case 3A in this embodiment, so that a break is not caused even when a multi-layered metal pattern is formed on the soft organic substrate 4A.

Even when a different material is used for the base plate 5 and the module case 3A, when the space (opening 7) between the base plate 5 and the module case 3A is determined to satisfy the following:

(an amount of change in space size to a change in temperature)÷(an original space size)≦6%, the antenna pattern 4B of the antenna 4 adhered to the base plate 5 and the module case 3A is not broken even if a change in temperature is added to the vehicle-mounted radar equipment 1.

As described above, the cost can be reduced by making the module case 3A compact, and reliability can be prevented from being lowered due to a break of the antenna pattern resulting from having two adhering surfaces on the antenna 4.

Details of the antenna pattern 4B will be described with reference to FIG. 4 and FIG. 5.

Figure 4:
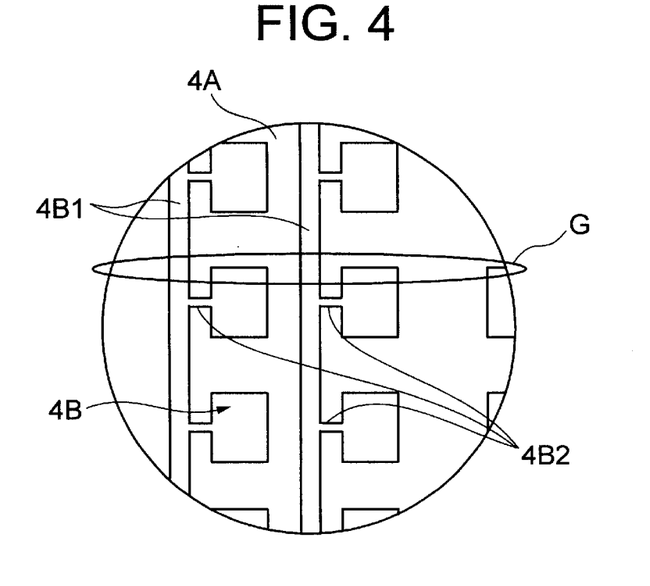
FIG. 4 is an enlarged diagram showing the section shown in a circle X2 of FIG. 3.

FIG. 4 is an enlarged diagram of the portion in the circle X2 of FIG. 3. Like reference numerals used in FIG. 4 designate like parts of FIG. 1 to FIG. 3.

Figure 5:
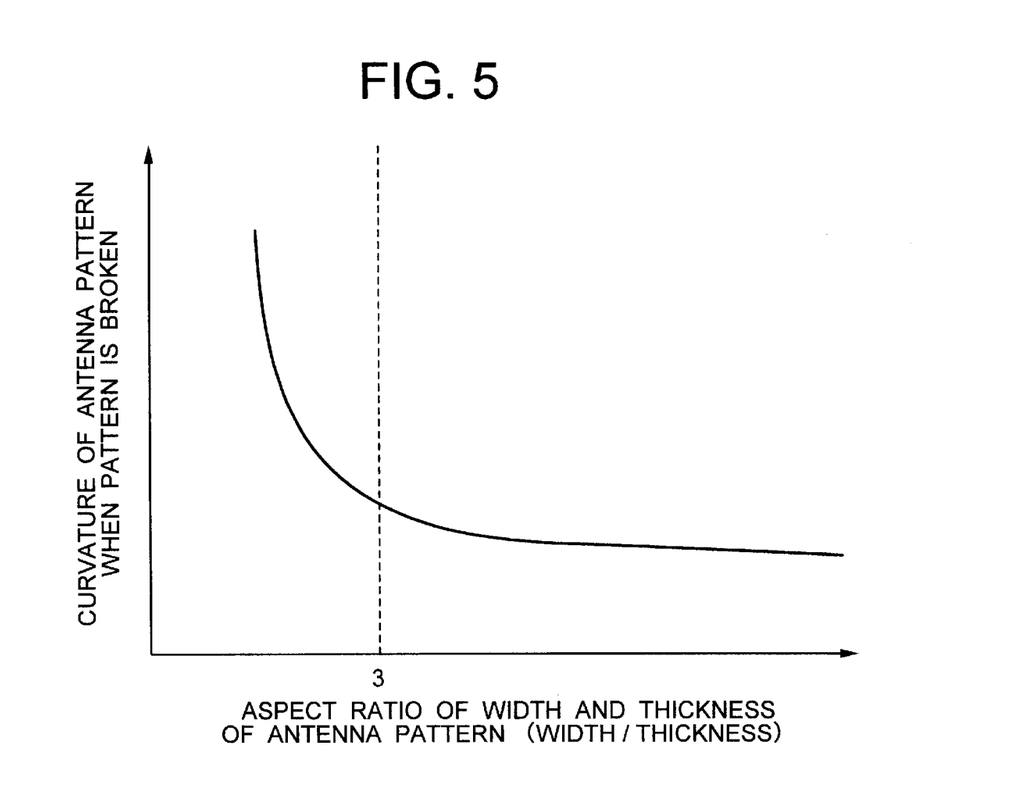
FIG. 5 is a correlation diagram of an aspect ratio of an antenna pattern 4B and a curvature of the antenna pattern 4B at a time when it is forcefully displaced and broken.

FIG. 5 shows a correlation between an aspect ratio (width/thickness) of a width and a thickness of the antenna pattern 4B and a curvature of the antenna pattern 4B at a time when the antenna pattern 4B is forcefully displaced and broken.

When the aspect ratio (width/thickness) between a width and a thickness of the antenna pattern 4B is about 3 or below, a stress concentration is produced on the bent outer periphery part of the antenna pattern 4B, which is then broken at a high curvature. In other words, it is seen that it is broken under a low stress state and broken at a fixed curvature regardless of the aspect ratio if the stress concentration is not produced.

Therefore, thick lines 4B1 and thin lines 4B2 are disposed on the antenna pattern 4B in this embodiment as shown in FIG. 4. Among the antenna patterns 4B, the thick lines 4B1 are disposed on a boundary section G which is an adjacent part of the base plate 5 and the opening 7 and an adjacent part of the module 3 and the opening 7.

Specifically, because the aspect ratio (width/thickness) of a width and a thickness of the antenna pattern 4B is 3 or below, namely the thickness is about 40 μm, it is configured that the thin line 4B2 having a width of about 120 μm or below does not straddle the boundary section G but the thick line 4B1 having an aspect ratio of 3 or more straddles the boundary section G.

Therefore, the antenna pattern 4B has its yield strength increased against the thermal stress resulting from a difference in coefficient of linear expansion between the materials of the base plate 5 and the module case 3A and its reliability improved.

And, because the boundary section G is provided with the thick line of 100 μm or more, the antenna pattern 4B has its yield strength increased against a difference in coefficient of linear expansion between the materials of the base plate 5 and the module case 3A and its reliability improved.

When the antenna pattern 4B of the antenna 4 is disposed on the module 3 alone, namely, if the antenna pattern 4B is not formed on the side of the antenna 4 of the boundary section G, the thermal stress resulting from a difference in coefficient of linear expansion between the materials of the base plate 5 and the module case 3A does not exert an influence, and reliability is further improved.

Then, the structure and operation of a millimeter wave laser system using the radar equipment of this embodiment will be described with reference to FIG. 6.

Figure 6:
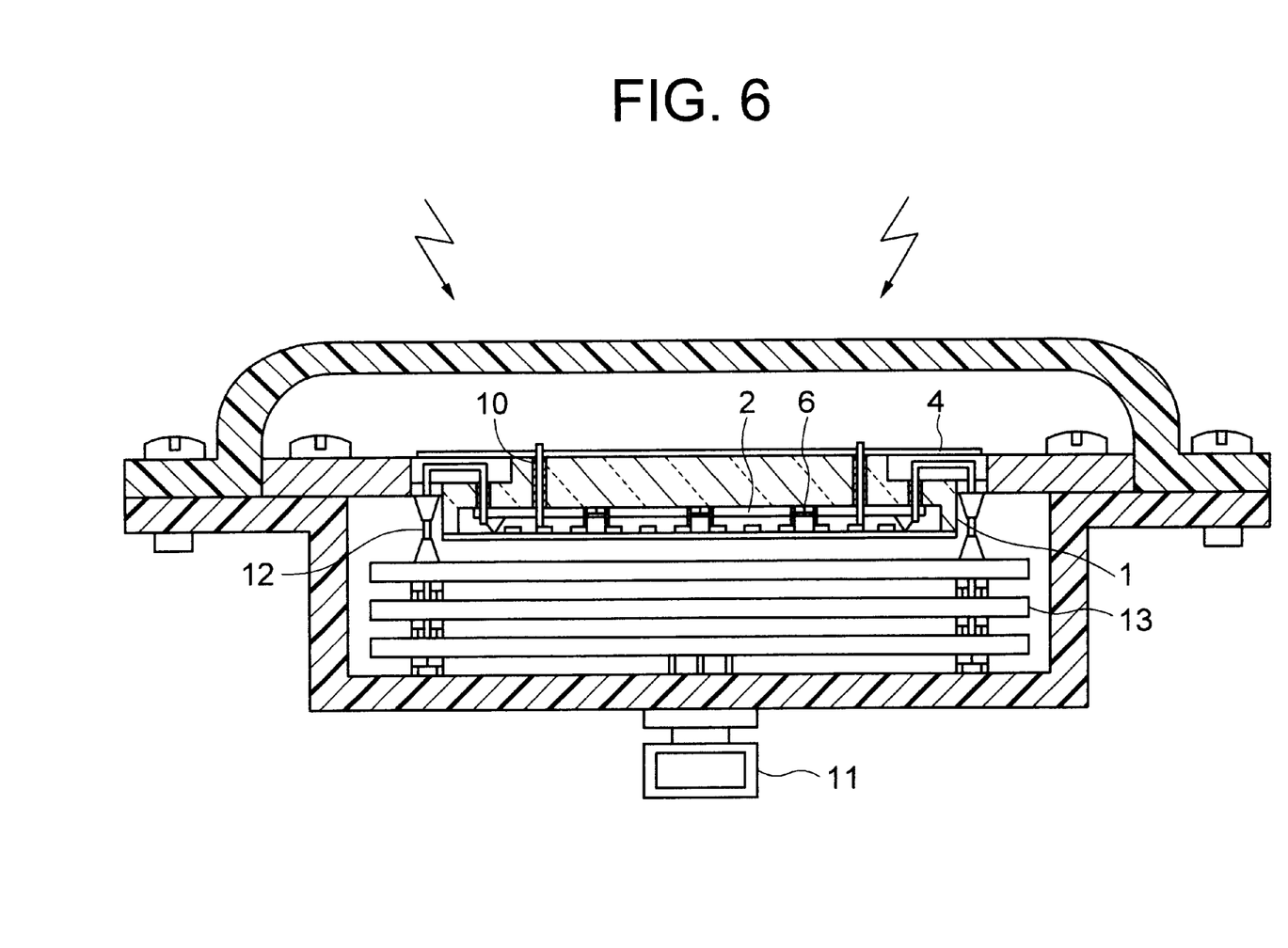
FIG. 6 is a sectional diagram showing a structure of the millimeter wave radar system according to the first embodiment of the invention.

FIG. 6 is a sectional diagram showing the structure of the millimeter wave radar system according to a first embodiment of the invention. Like reference numerals used in FIG. 6 designate like parts of FIG. 1 to FIG. 4.

A signal processing circuit 13 receives power from a connector 11 and also supplies predetermined power to the radar equipment 1 through a harness 12. Thus, an oscillator of the IC 6 generates a millimeter wave of 76 GHz, which is then amplified by an amplifier, passed through the circuit board 2 and supplied to the antenna through the glass coaxial cable 10. The millimeter wave is sent from the antenna 4, which also receives a target-reflected wave. The received wave is mixed with the sent wave by the IC 6 and sent as an IF signal to the signal processing circuit 13 through the harness 12 to calculate relative velocity information, range information, angle information and the like between a millimeter wave radar-equipped vehicle or the like and the target. Their results are output through the connector 11.

As described above, the antenna pattern can be prevented from being broken according to this embodiment.

Then, the high frequency transmitter-receiver according to a second embodiment of the invention will be described with reference to FIG. 7 and FIG. 8. In this embodiment, for example, radar equipment will be described as the high frequency transmitter-receiver.

Figure 7:
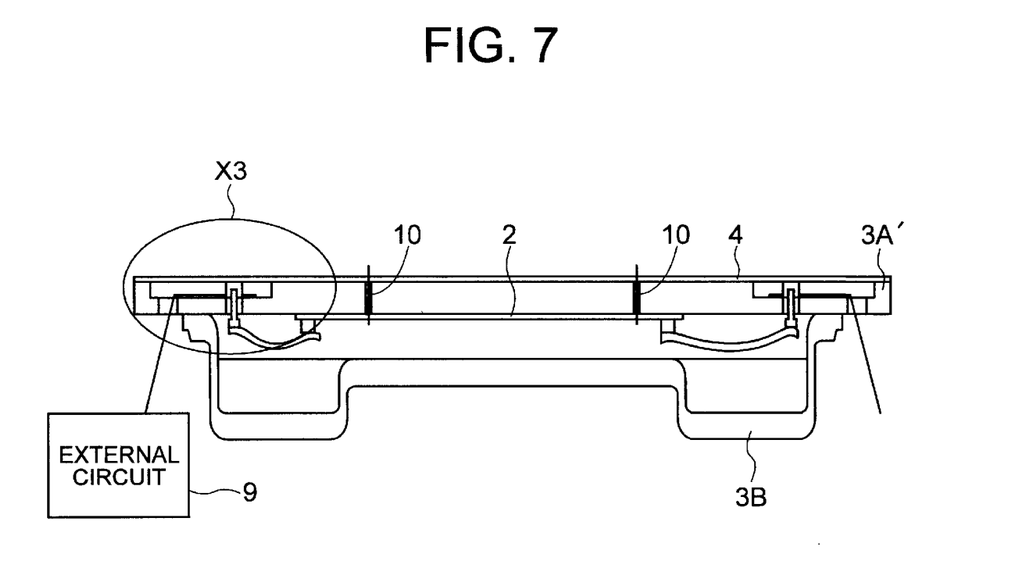
FIG. 7 is a sectional diagram showing a general structure of the high frequency transmitter-receiver according to a second embodiment of the invention.

FIG. 7 is a sectional diagram showing a general structure of the high frequency transmitter-receiver according to the second embodiment of the invention. FIG. 8 is an enlarged sectional diagram of the portion in the circle X3 of FIG. 7. Like reference numerals used in FIG. 7 and FIG. 8 designate like parts of FIG. 1.

As shown in FIG. 7, a module case 3A' of this embodiment has integrated the module case 3A and the base plate 5 shown in FIG. 1. The antenna 4 is fixed to the module case 3A'.

Figure 8:
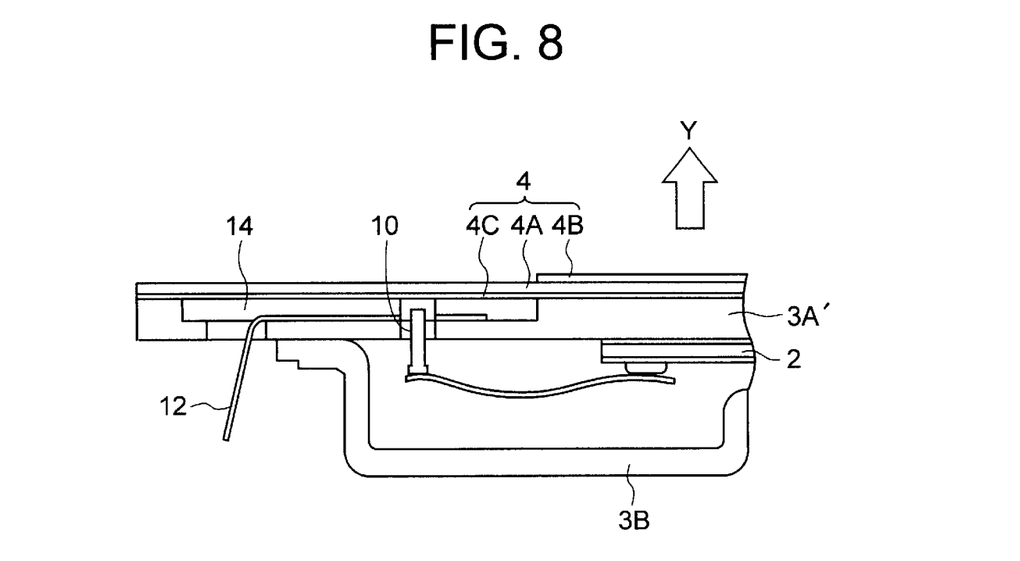
FIG. 8 is an enlarged sectional diagram showing the section shown in a circle X3 of FIG. 7.

As shown in FIG. 8, a recess 14 is formed so that the glass coaxial cable 10 to be connected to the external circuit 9 is located at the back of the antenna 4 with respect to a transmitting and receiving direction Y of a signal from the antenna 4, the GND 4C of the antenna 4 covers the recess 14, and the antenna pattern 4B is configured not to cover the recess 14.

According to this embodiment, the bonding surface of the antenna pattern 4B is limited to the module case 3A' only and is a single member surface, so that the effect of the thermal stress can be lowered. The GND 4C seals unnecessary electromagnetic waves generated from the harness 12.

Therefore, the antenna pattern of this embodiment can be prevented from being broken.

Figure 9:
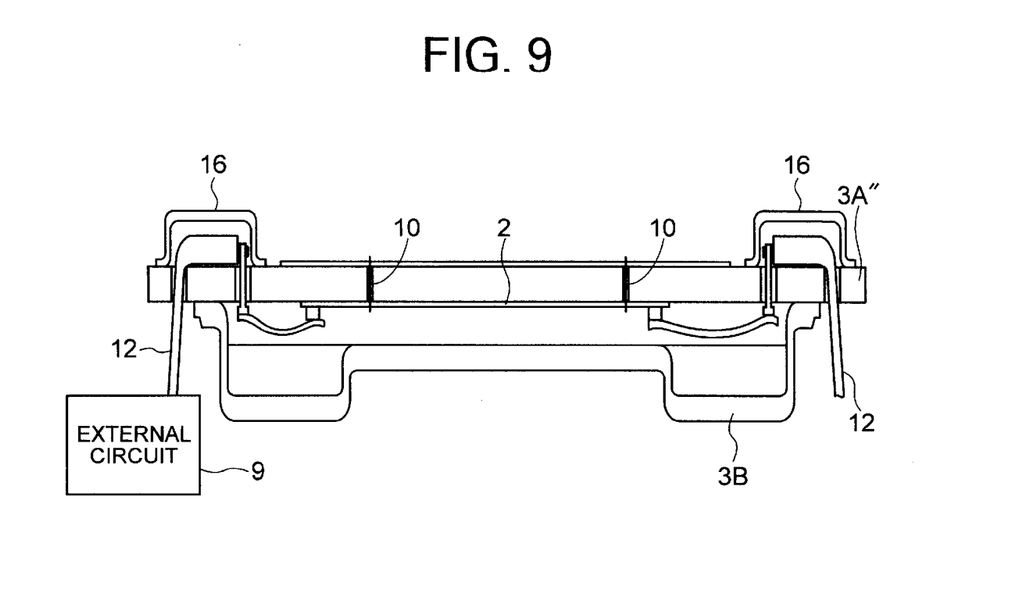
FIG. 9 is a sectional diagram showing a general structure of the high frequency transmitter-receiver according to a third embodiment of the invention.

Referring to FIG. 9, a structure of the high frequency transmitter-receiver according to a third embodiment of the invention will be described. In this embodiment, for example, radar equipment will be described as the high frequency transmitter-receiver.

FIG. 9 is a sectional diagram showing a general structure of the high frequency transmitter-receiver according to the third embodiment of the invention. Like reference numerals of FIG. 9 designate like parts of FIG. 1.

A module case 3A'' of this embodiment has integrated the module case 3A and the base plate 5 shown in FIG. 1. The antenna 4 is fixed to the module case 3A''.

Different from the example shown in FIG. 7, the recess 14 is not formed in the module case 3A' of this embodiment, but metal harness caps 16 of Fe or the like are mounted instead.

The harness caps 16 are to shield unnecessary electromagnetic waves from harnesses 12 in the same way as the GND 4C shown in FIG. 7. Because the bonding surface of the antenna pattern 4B can also be a single member surface, a thermal stress generated can be lowered.

Therefore, the antenna pattern of this embodiment can be prevented from being broken.

Figure 10:
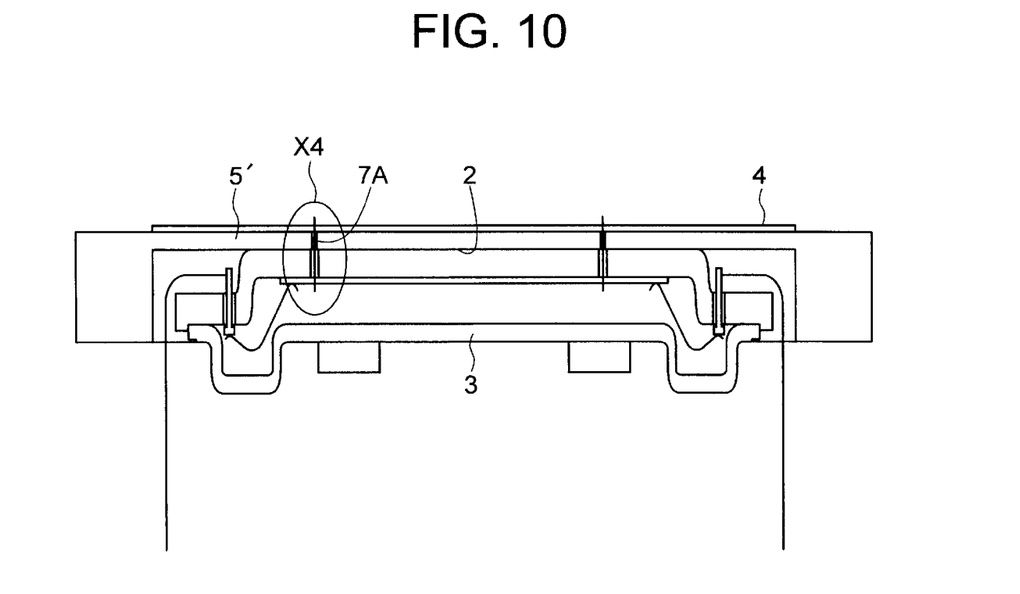
FIG. 10 is a sectional diagram showing a general structure of the high frequency transmitter-receiver according to a fourth embodiment of the invention.
Figure 11:
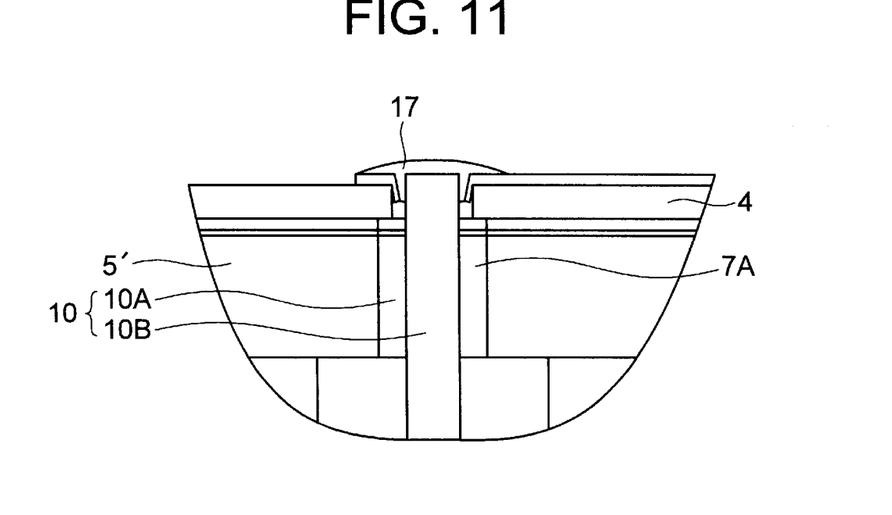
FIG. 11 is an enlarged sectional diagram showing the section shown in a circle X4 of FIG. 10.

Referring to FIG. 10 and FIG. 11, a structure of the high frequency transmitter-receiver according to a fourth embodiment of the present invention will be described. In this embodiment, for example, radar equipment will be described as the high frequency transmitter-receiver.

FIG. 10 is a sectional diagram showing a general structure of the high frequency transmitter-receiver of the fourth embodiment of the invention. FIG. 11 is an enlarged sectional diagram of the portion in the circle X4 of FIG. 10. Like reference numerals of FIG. 10 and FIG. 11 designate like parts of FIG. 1.

As shown in FIG. 10, a base plate 5' of this embodiment does not have the large opening 7 shown in FIG. 1 but has a small opening 7A instead. The antenna 4 is provided on one surface of the base plate 5', and the module 3 is provided on the other surface. The antenna 4 is adhered to the base plate 5'.

As shown in FIG. 11, only the core 10B of the glass coaxial cable 10 formed in the module 3 is connected to the antenna 4 by solder 3 through the opening 7A.

In this embodiment, the antenna 4 is adhered to the base plate 5' and can have its adhering surface as a single member. Thus, the antenna 4 is very tough against a crack of the antenna pattern 4B and good in bondability because there is not an uneven portion on the surface, so that it has outstanding properties.

A junction between the glass coaxial cable 10 and the antenna 4 will be described in detail with reference to FIG. 11.

The glass coaxial cable 10 is comprised of the glass line 10A and the core 10B. Here, impedance Z of the glass coaxial cable 10 is designed to be indicated by the following expression (1) and to be 50Ω.

$$Z = 1/(2\pi) \times \sqrt{0}(\mu/\epsilon) \ln(b/a) \qquad (1)$$

Here, μ and ε denote a magnetic permeability and a dielectric constant of the glass 10A, a means a diameter of the core 10B, and b means an outside diameter of the glass 10A. In this embodiment, a is 0.2 mm, and b is 0.95 mm.

And, the opening 7A of the base plate 5 is φ 0.46 mm, and the core 10B is soldered to the antenna 4 through the opening 7A. The coaxial section which is comprised of the opening 7A and the core 10B also has an impedance of 50Ω according to the expression (1).

Thus, a loss due to a change in the transmission line can be suppressed to be small. The transmission loss can also be lowered by forming an impedance matching circuit on the antenna 4 or the high frequency circuit.

Therefore, the antenna pattern of this embodiment can be prevented from being broken.

Figure 12:
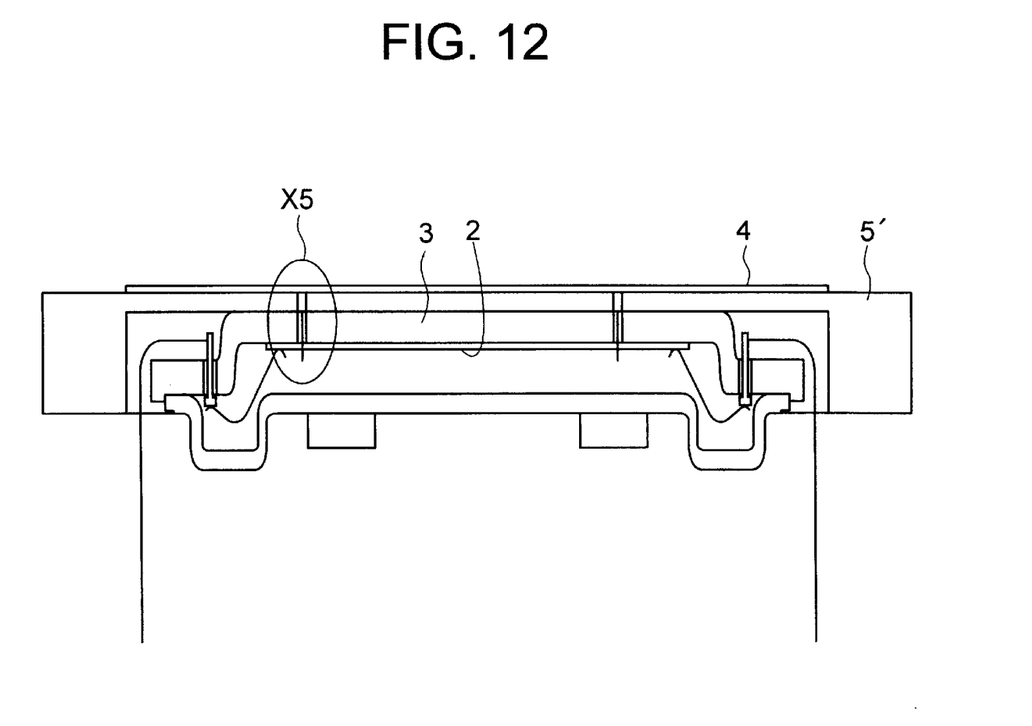
FIG. 12 is a sectional diagram showing a general structure of the high frequency transmitter-receiver according to a fifth embodiment of the invention.
Figure 13:
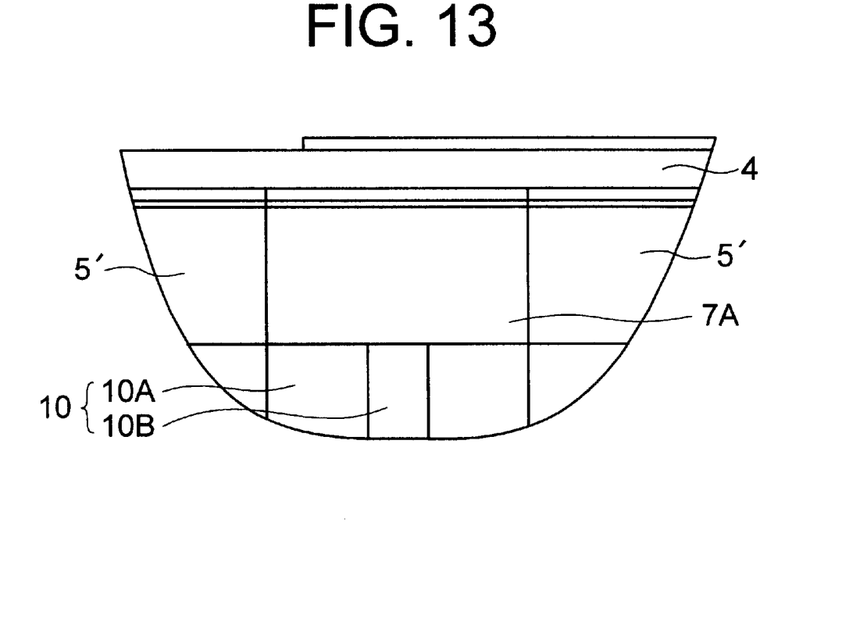
FIG. 13 is an enlarged sectional diagram showing the section shown in a circle X5 of FIG. 12.

Referring to FIG. 12 and FIG. 13, a structure of the high frequency transmitter-receiver according to a fifth embodiment of the invention will be described. In this embodiment, for example, radar equipment will be described as the high frequency transmitter-receiver.

FIG. 12 is a sectional diagram showing a general structure of the high frequency transmitter-receiver according to the fifth embodiment of the invention. FIG. 13 is an enlarged sectional diagram showing the portion in the circle X5 of FIG. 12. Like reference numerals of FIG. 12 and FIG. 13 designate like parts of FIG. 1.

As shown in FIG. 12, the base plate 5' of this embodiment is the same as the base plate 5' shown in FIG. 10, does not have the same large opening 7 shown in FIG. 1 but has the small opening 7A instead. The base plate 5' has the antenna 4 on its one surface and the module 3 on the other surface. The antenna 4 is adhered to the base plate 5'.

In this embodiment, the junction between the glass coaxial cable 10 and the antenna 4 is different from the embodiment shown in FIG. 10. The core 10B of the glass coaxial cable 10 is present only in a range formed within the glass 10A, and the opening 7A of the base plate 5' forms a waveguide structure so to feed power to the antenna 4.

In the example shown in FIG. 10, positioning of the core 10B of the coaxial cable and the opening 7 is required to adhere the base plate 5' and the module 3, but it is not required in this embodiment, so that the mounting step can be simplified. It is also not necessary to have a via or soldering to connect the core 10B to the antenna 4, so that the mounting process can be decreased.

Here, the structure of another example of the high frequency transmitter-receiver according to the fifth embodiment of the invention will be described with reference to FIG. 14. In this embodiment, for example, radar equipment will be described as the high frequency transmitter-receiver.

Figure 14:
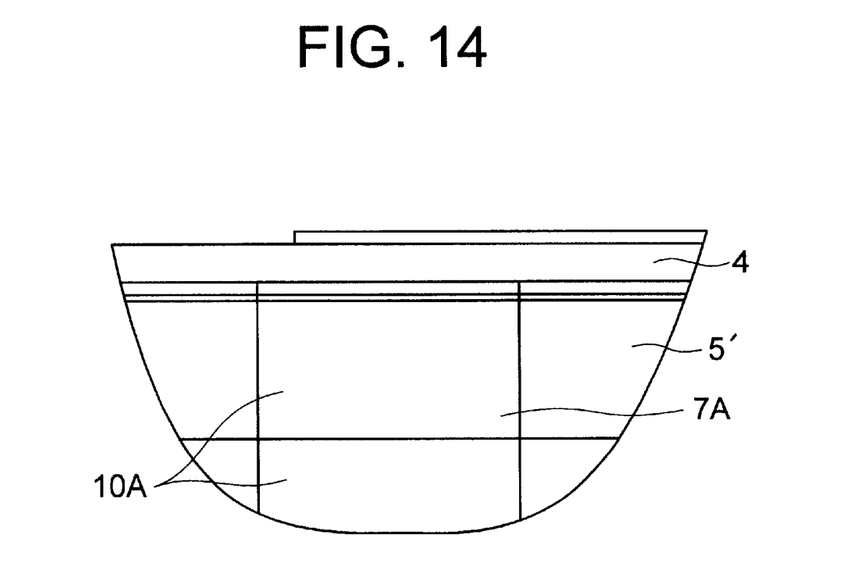
FIG. 14 is an enlarged sectional diagram showing the section shown in a circle X5 of FIG. 12 to indicate the structure of another example of the high frequency transmitter-receiver according to the fifth embodiment of the invention.

FIG. 14 shows the structure of another example of the high frequency transmitter-receiver according to the fifth embodiment of the invention and is an enlarged sectional diagram of the portion in the circle X5 of FIG. 12. Like reference numerals of FIG. 14 designate like parts of FIG. 1.

In this embodiment, the glass coaxial cable 10 does not have the core 10B, and the glass 10A is filled into the opening 7A to form a waveguide structure.

Therefore, the antenna pattern of this embodiment can be prevented from being broken.

Referring to FIG. 15 to FIG. 18, a structure of the high frequency transmitter-receiver according to a sixth embodiment of the invention will be described. In this embodiment, for example, radar equipment will be described as the high frequency transmitter-receiver.

Figure 15:
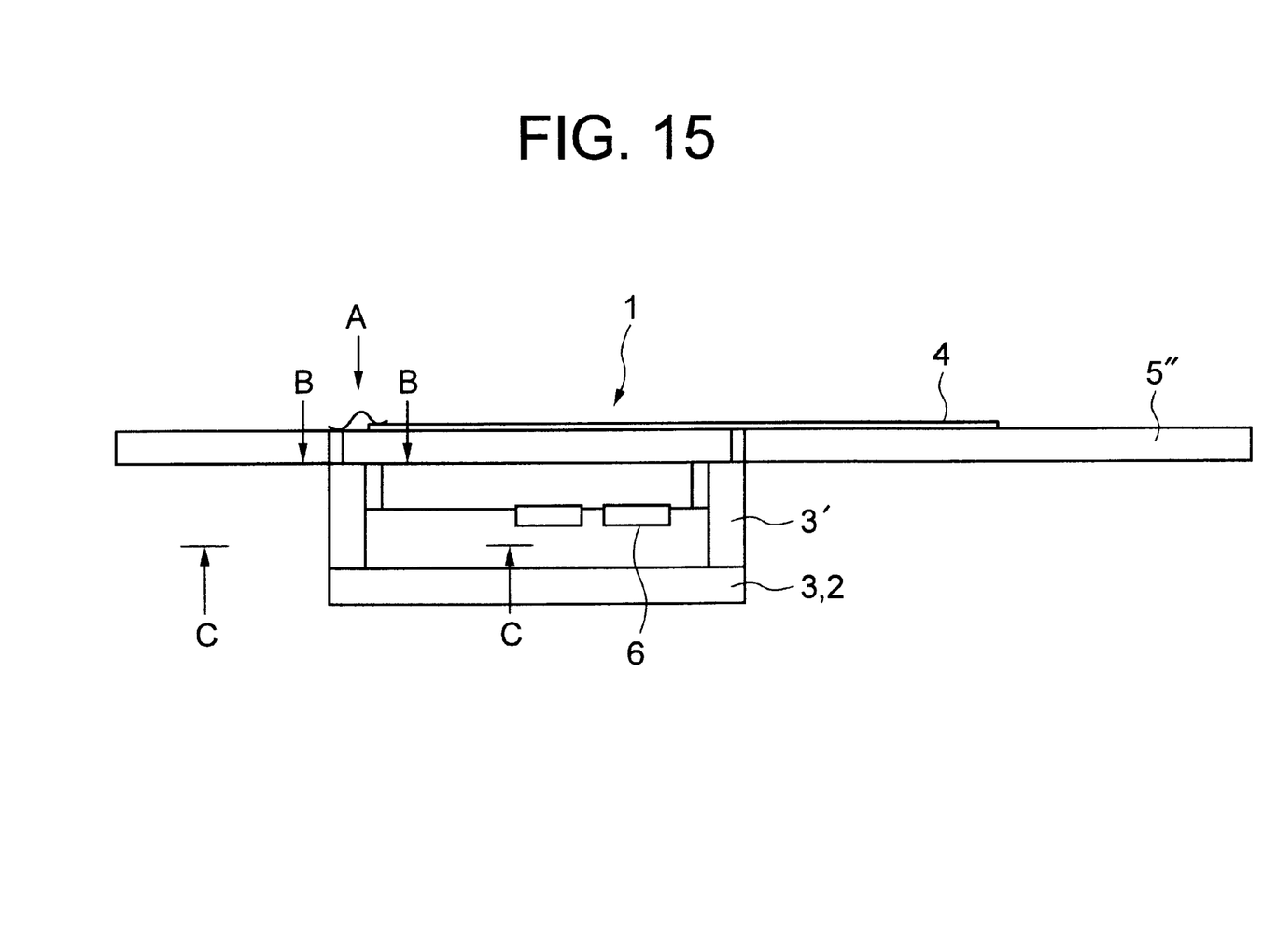
FIG. 15 is a sectional diagram showing a general structure of the high frequency transmitter-receiver according to a sixth embodiment of the invention.
Figure 16:
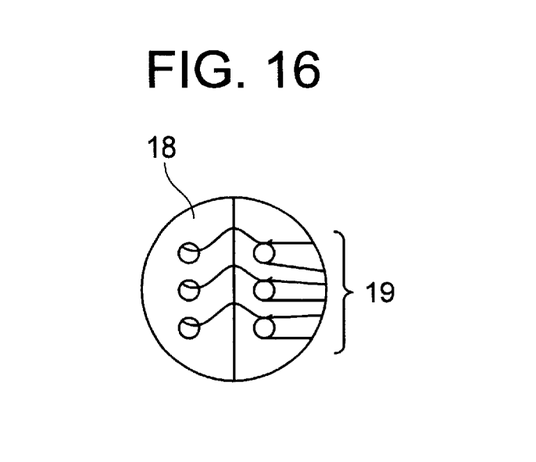
FIG. 16 is an A—A arrow diagram of FIG. 15.
Figure 17:
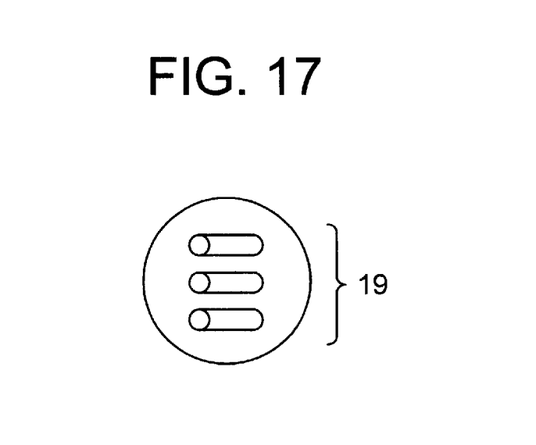
FIG. 17 a B—B arrow diagram of FIG. 15.
Figure 18:
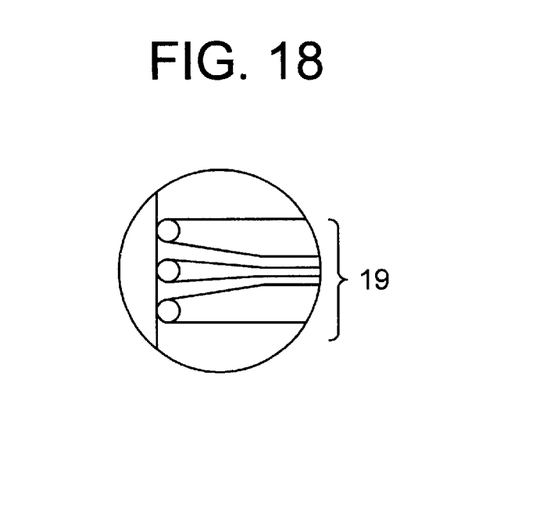
FIG. 18 a C—C arrow diagram of FIG. 15.

FIG. 15 is a sectional diagram showing a general structure of the high frequency transmitter-receiver according to the sixth embodiment of the invention. FIG. 16 is an A—A arrow diagram of FIG. 15, FIG. 17 is a B—B arrow diagram of FIG. 15, and FIG. 18 is a C—C arrow diagram of FIG. 15. Like reference numerals of FIG. 15 designate like parts of FIG. 1.

As shown in FIG. 15, the radar equipment 1 of this embodiment is comprised of the module 3', the antenna 4 and a base plate 5".

The module 3' of multilayered ceramics has a high frequency circuit formed by baking a wiring material of Au paste or the like onto the ceramics portion at a high temperature. The high frequency circuit is provided with a plurality of ICs 6 for a high frequency such as an oscillator, a mixer, a low-noise amplifier and the like formed of a semiconductor substrate of GaAs or the like, and they are respectively connected to the circuit by an Au wire or the like to send and receive a signal.

And, the module cover 3B of ceramics or a metal material having a low coefficient of linear expansion is bonded to the module 3 by solder or brazing material to keep the ICs 6 in an airtight state. A signal pickup section is formed by disposing a coplanar line 19 on the multilayered substrate as shown in FIG. 16 to FIG. 18. Because the multilayered ceramics is made of a sheet substrate having a standardized size, the number of substrates taken from the sheet relates greatly to the cost, so that the multilayered ceramics is produced in a minimal size.

The antenna 4 has the same structure as the antenna 4 shown in FIG. 1. The antenna 4 is larger than the module 3', so that the antenna 4 is adhered to one surface of the base plate 5" with an Ag adhesive agent, solder or the like, and the module 3' is adhered to the other surface with the Ag adhesive agent, solder or the like.

As shown in FIG. 16 to FIG. 18, the coplanar line 19 extended from the module 3' and the coplanar line 19 which is also formed on the base plate 5" are adhered with the Ag adhesive agent, solder or the like, and the coplanar line 19 of the base plate 5" is connected to the antenna 4 by an Au wire 18 or the like.

In this embodiment, the antenna 4 is adhered to the base plate 5" only and can be only one member, so that it is very tough against a crack of the antenna pattern 4B and good in bondability because it does not have an uneven portion on the surface.

Therefore, the antenna pattern according to this embodiment can be prevented from being broken.

Figure 19:
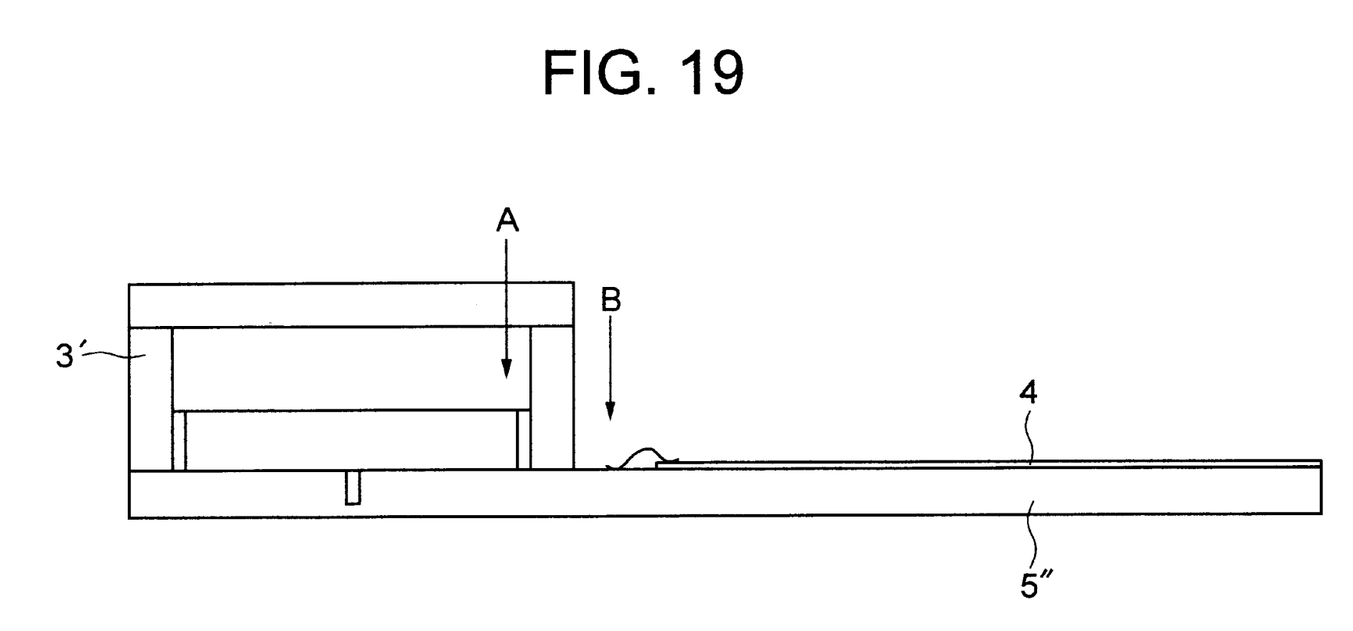
FIG. 19 is a sectional diagram showing a general structure of the high frequency transmitter-receiver according to a seventh embodiment of the invention.
Figure 20:
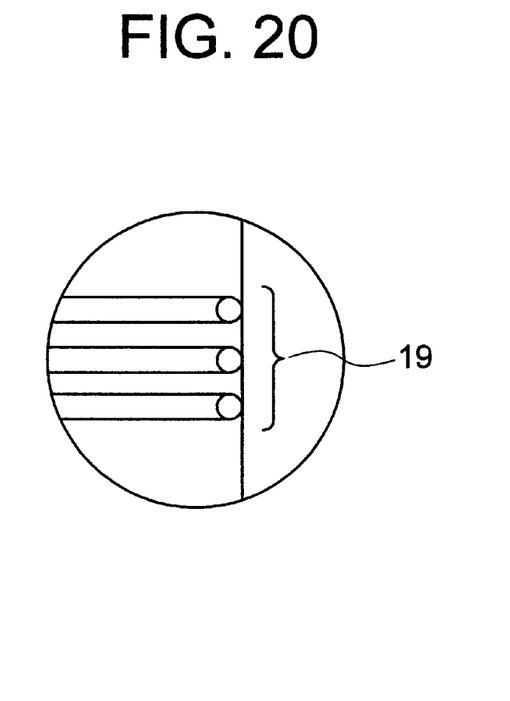
FIG. 20 is an A—A arrow diagram of FIG. 19.
Figure 21:
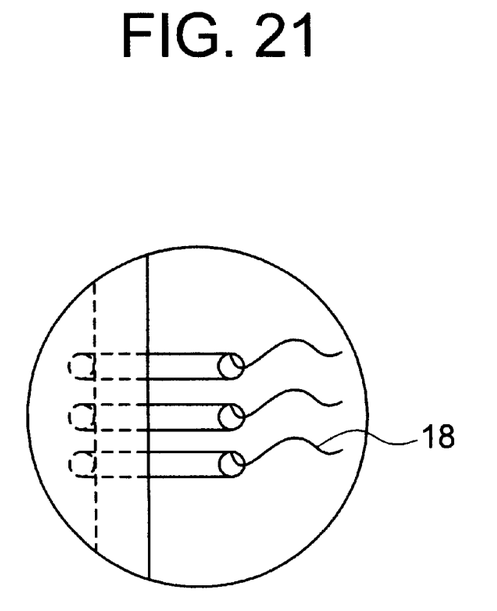
FIG. 21 is a B—B arrow diagram of FIG. 19.

Referring to FIG. 19 to FIG. 21, a structure of the high frequency transmitter-receiver according to a seventh embodiment of the invention will be described. In this embodiment, for example, radar equipment will be described as the high frequency transmitter-receiver.

FIG. 19 is a sectional diagram showing a general structure of the high frequency transmitter-receiver according to the seventh embodiment of the invention. FIG. 20 is an A—A arrow diagram, and FIG. 21 is a B—B arrow diagram of FIG. 19. Like reference numerals of FIG. 19 designate like parts of FIG. 1.

As shown in FIG. 19, the radar equipment 1 according to this embodiment is comprised of the module 3', the antenna 4 and the base plate 5". But, the module 3 and the antenna 4 are mounted on a position different from the embodiment shown in FIG. 5. The module 3 and the base plate 5 are disposed on the same surface.

As shown in FIG. 20 and FIG. 21, the coplanar line 19 extended from the module 3 and the coplanar line 19 which is also formed on the base plate 5 are adhered with an Ag adhesive agent, solder or the like, and the coplanar line 19 of the base plate 5 is connected to the antenna 4 by the Au wire 18 or the like.

Therefore, the antenna pattern according to this embodiment can be prevented from being broken.

Thus, the antenna pattern can be prevented from being broken according to the embodiments of the present invention.

It will be further understood by those skilled in the art that the foregoing description has been made on embodiments of the invention and that various changes and modifications may be made in the invention without departing from the spirit of the invention and scope of the appended claims.

What is claimed is:

1. A high frequency transmitter/receiver which has a high frequency antenna comprised of an organic substrate and a metal pattern formed on the organic substrate and a base to which the high frequency antenna is fixed by adhering, wherein:

the base is formed of a plurality of bases and the high frequency antenna is fixed by adhering to cover the plurality of bases; and a gap between the plurality of bases to which the antenna is adhered satisfies the following expression:

(an amount of change in gap size to a change in operating temperature)÷(an original gap size)≦6%.

2. The high frequency transmitter-receiver according to claim 1, wherein the metal pattern having an aspect ratio (width/thickness) of a width and a thickness of the metal pattern is 3 or more or a width of 100 μm or more is formed to cover the plurality of bases.

3. The high frequency transmitter-receiver according to claim 1, wherein the metal pattern is formed on the side of the antenna within the boundary where the antenna is adhered to and to cover the plurality of bases.

4. The high frequency transmitter-receiver according to claim 1, further comprising:

a high frequency circuit mounted on the base;

an external circuit for supplying power to the high frequency circuit and processing a signal;

a plurality of conducting pins which are supported by an insulator in an opening formed through the base and electrically connect the high frequency circuit with the antenna and the high frequency circuit with the external circuit; and a recess which is formed in the base to have the conducting pin located at back of the antenna surface with respect to a direction of transmitting and receiving a signal to and from the antenna and which is covered by the antenna.

* * * * *